United States Patent [19]

Lienhard et al.

[11] 4,378,970

[45] Apr. 5, 1983

[54] RED MONOAZO SULPHONIC ACID DYESTUFFS FOR POLYAMIDE

[75] Inventors: Paul Lienhard, Frenkendorf; Fabio Beffa, Riehen, both of Switzerland

[73] Assignee: Ciba-Geigy AG, Basel, Switzerland

[21] Appl. No.: 311,595

[22] Filed: Oct. 15, 1981

Related U.S. Application Data

[60] Division of Ser. No. 111,301, Jan. 11, 1980, Pat. No. 4,312,808, which is a continuation-in-part of Ser. No. 720,621, Sep. 3, 1976, abandoned, which is a continuation of Ser. No. 624,883, Oct. 22, 1975, abandoned, which is a continuation of Ser. No. 389,511, Aug. 20, 1973, abandoned, which is a continuation of Ser. No. 102,062, Dec. 28, 1970, abandoned.

[30] Foreign Application Priority Data

Dec. 29, 1969 [CH] Switzerland .................... 19309/69

[51] Int. Cl.³ .................. C09B 29/28; C07C 107/04
[52] U.S. Cl. ................................. 8/683; 8/540; 8/694; 8/917; 8/924; 8/926; 8/928; 260/198
[58] Field of Search .............. 8/683, 694; 260/198

[56] References Cited

U.S. PATENT DOCUMENTS 2,998,418  8/1961  Frisch ........................ 260/198
3,001,983  9/1961  Schmid et al. ............... 260/198
4,312,808  1/1982  Lienhard et al. ............ 260/198

FOREIGN PATENT DOCUMENTS 592999  2/1960  Canada ....................... 260/198

*Primary Examiner*—A. Lionel Clingman
*Attorney, Agent, or Firm*—Wenderoth, Lind & Ponack

[57] ABSTRACT

Red monoazo dyestuffs frm diazotised 1-aminobenzene-2-sulphonic acid-N-methyl-N-cyclohexylamide or 1-amino-4-,-5- or -6-methyl-benzene-2-sulphonic acid-N-methyl-N-cyclohexylamide and 2-amino-8-hydroxynaphthalene-6-sulphonic acid are disclosed which are particularly distinguished by their good migration and levelling properties and excellent fastness to light. Said dyestuffs are moreover suitable for obtaining very even combination dyeings together with known blue or yellow acid dyestuffs. These dyestuffs are particularly suited for the dyeing of carpeting, upholstery fabrics and drapery materials.

2 Claims, No Drawings

RED MONOAZO SULPHONIC ACID DYESTUFFS FOR POLYAMIDE

This is a divisional of Ser. No. 111,301 filed Jan. 11, 1980 now U.S. Pat. No. 4,312,808 which is a continuation-in-part of Ser. No. 720,621, filed Sept. 3, 1976, now abandoned, which is a continuation of Ser. No. 624,883, filed Oct. 22, 1975, now abandoned, which is a continuation of Ser. No. 389,511, filed Aug. 20, 1973, now abandoned, which is a continuation of Ser. No. 102,062, filed Dec. 28, 1970, now abandoned.

DETAILED DISCLOSURE

The present invention relates to new red monoazo dyestuffs, a process for the production thereof, their use for the dyeing or printing of organic fiber material, particularly fiber material made from natural or synthetic polyamide, as well as the fiber material dyed or printed using the new dyestuffs.

It has long been recognized in the art that due to irregularities in the affinity of synthetic polyamide for acid and direct dyestuffs, level dyeings have been difficult to attain with these dyestuffs. Thus dyestuffs and dyeing processes which will tend to cover up the yarn variations have been sought by dyers and dye manufacturers. Dyestuffs which have good migration properties are better able to fulfill this requirement: the better the migration properties, the better the cover-up of the yarn variations.

Good migration and leveling properties also confer the dyestuff with other advantages in the application of the dyestuff:

They allow a relatively rapid rate of exhaustion. Good migration properties are especially important for dyeing in a jigger. Dyestuffs with good migration properties also have the advantage of being more readily combinable for so-called trichromatic color combinations (red/yellow/blue). Good leveling properties in the dye-bath also means that faulty dyeings may be corrected much easier, which also means a reduction in dyeing time and costs.

It has been found that new red monoazo dyestuffs having particularly good migration and levelling properties, of Formula I

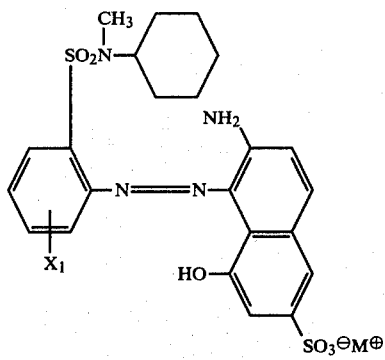

in which
$X_1$ represents hydrogen or the methyl group, and
$M^\oplus$ represents a colorless cation,
are obtained when the diazonium compound of an amine of Formula II

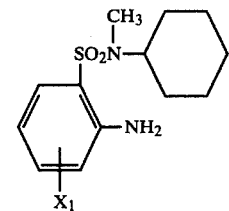

wherein $X_1$ has the meaning given under Formula I, is coupled, in a neutral to acid medium, with a coupling component of Formula III

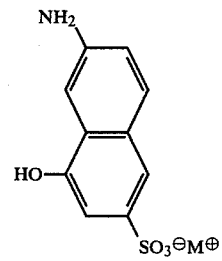

wherein $M^\oplus$ has the meaning given under Formula I.

$M^\oplus$ in the meaning of a colourless cation represents, e.g. the hydrogen cation, an alkaline earth metal or an alkali metal cation, such as the calcium, lithium, sodium or potassium cation, or the ammonium cation. $M^\oplus$ preferably represents the sodium cation.

Examples of diazo components of Formula II are 1-amino-4-, -5- or -6-methyl-benzene-2-sulphonic acid-N-methyl-N-cyclohexylamide, and, preferably, 1-aminobenzene-2-sulphonic acid-N-methyl-N-cyclohexylamide.

Diazo components of Formula II, usable according to the invention, can be prepared in a manner known per se, e.g. by reacting optionally methyl-substituted 1-nitrobenzene-2-sulphonic acid chloride with N-methyl-cyclohexylamine to obtain the corresponding 1-nitrobenzene-2-sulphonic acid-N-methyl-N-cyclohexylamide and subsequently reducing the nitro group to the amino group.

Diazotisation of the diazo components of Formula II, usable according to the invention, is carried out by usual methods, for example with nitrosyl sulphuric acid or, preferably in aqueous dispersion, in lower fatty acids, such as acetic acid or formic acid, or mixtures thereof with water, in lower alcohols, such as methanol, ethanol, propanol, or ethylene glycol monomethyl ether or ethylene glycol monoethyl ether, in the presence of the required amount of aqueous inorganic acid, with, e.g., concentrated aqueous solutions of alkali nitrite.

Coupling in a neutral to acid medium is carried out in a manner known per se, preferably in weakly acid, aqueous or organic-aqueous solution, for example in the presence of lower alcohols such as ethanol, lower fatty acids such as acetic acid, or lower fatty acid amides such as formamide.

Isolation of the monoazo dyestuffs according to the invention is advantageously effected by salting out with sodium chloride or potassium chloride, subsequent filtering, washing and drying.

The dyestuffs of Formula I according to the invention, in the form of their alkaline earth metal, alkali metal or ammonium salts are brownish-red to dark brown powders which are easily soluble in water; more particularly, solutions of said dyestuffs, prepared with warm water, are stable, highly fluid and easily filterable after cooling. Therefore, such solutions are especially suitable for the dyeing and printing with cold concentrated dye liquors. With the dyestuffs according to the invention, organic fiber material can be dyed or printed in red shades, the dyeings or prints obtained therewith having very good migration and levelling properties as well as good to excellent fastness to light. Although these dyestuffs have only moderate fastness to wet processing, this is not significant since, if necessary, fastness to wet processing can be improved by an aftertreatment. In most cases, however, this is not necessary since the main use for these dyestuffs is for the dyeing of carpeting, upholstery fabrics and drapery materials, where such wet-fastness is not required. Dyestuffs of Formula I, according to the invention, are also stable to boiling and yield non-streaky dyeings especially on textured synthetic polyamide fiber material. Cellulose fibers and polyolefin fibers which have not been basic modified are well reserved by the dyestuffs of this invention. Finally, the dyestuffs according to the invention together with known blue or yellow acid dyestuffs, are suitable for obtaining very even combination dyeings. Especially valuable yellowish-red dyeings are obtained when using dyestuffs of Formula I, according to the invention, together with known scarlet monoazo dyestuffs containing sulphonic acid groups.

Examples of organic fiber material which can be dyed or printed with the dyestuffs according to the invention are: basic modified polyolefin fibers such as basic modified polyethylene and polypropylene fibers, e.g. Meraklon DR, DL or DO, as well as polyurethane fibers, particularly, however, natural or synthetic polyamide fibers.

As fiber material made from natural polyamide, especially wool but also silk can be used. Examples of fiber material made from synthetic polyamide which can be dyed or printed with the dyestuffs according to the invention, are: condensation products from hexamethylene diamine and adipic acid (Polyamide 6.6) or sebacic acid (Polyamide 6.10) or mixed condensation products, e.g. those from hexamethylene diamine, adipic acid and ε-Caprolactam (Polyamide 6.6/6), also polymerisation products from ε-caprolactam (Polyamide 6), for instance those known under the trade names Perlon, Grilon or Enkalon, or polymerization products from ω-aminoundecanoic acid (Polyamide 11), e.g. that known under the trade name Rilsan.

The organic fiber material can be dyed or printed in any chosen form in a manner known per se, according to the exhaustion process or continuously by impregnating it with aqueous, aqueous-organic or organic dye solutions and subjecting the impregnated material to a subsequent heat treatment.

Dyestuffs according to the invention, especially the preferred dyestuff of Formula I wherein $X_1$ represents hydrogen, are distinguished, with respect to the closest comparable known monoazo dyestuffs, by the following properties: compared with the dyestuff from diazotised 1-aminobenzene-2-sulphonic acid-N-butyl-N-cyclohexylamide acid 2-amino-8-hydroxynaphthalene-6-sulphonic acid (described in Swiss Pat. No. 347,287) by a better migration and levelling power on natural and synthetic polyamide fibers and an excellent compensation of streakiness due to the substrate, particularly on textured synthetic polyamide fiber materials; compared with the dyestuffs from diazotised 1-aminobenzene-2-sulphonic acid-cyclohexylamide acid 2-amino-8-hydroxynaphthalene-6-sulphonic acid (described in German Pat. No. 702,932) by a remarkably better absorption rate on basic modified polypropylene fibers and by better light fastness on natural and synthetic polyamide fibers; compared with the dyestuff from diazotised 1-aminobenzene-2-sulphonic acid-N-ethyl-N-phenylamide acid 2-amino-8-hydroxynaphtha-lene-6-sulphonic acid (described in German Pat. No. 702,932) by a better absorption and fixing rate on synthetic polyamide fibers, especially in the continuous dyeing of carpets, and compared with the dyestuff from diazotised 1-aminobenzene-2-sulphonic acid-N,N-dicyclohexylamide acid 2-amino-8-hydroxynaphthalene-6-sulphonic acid (described in U.S. Pat. No. 2,950,276) by a better migration power on synthetic polyamide fibers.

In the following Examples the temperatures are given in degrees Centigrade.

EXAMPLE 1

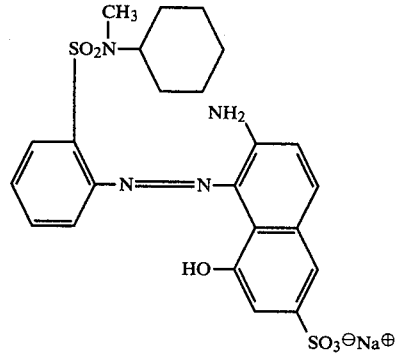

26.8 g of 1-aminobenzene-2-sulphonic acid-N-methyl-N-cyclohexylamide are dissolved in 100 ml of ethanol while heating; then 30 ml of 10 N hydrochloric acid are added to the obtained solution and the resulting mixture is cooled to −10°. Thereafter 20 ml of aqueous 5 M sodium nitrite solution are added dropwise and the mixture is stirred for 2 hours at −10° to 0°. The diazonium salt solution thus formed is then admixed with 1 g of sulphamic acid and stirred for another 15 minutes. Separately, 25 g of 2-amino-8-hydroxynaphthalene-6-sulphonic acid and 10 g of tetrahydro-naphthalene-sulphonic acid are dissolved in 200 ml of water and 12 ml of 10 N sodium hydroxide solution, 10 ml of glacial acetic acid are added to the resultant solution, and the above-described diazonium salt solution is added dropwise while stirring, the pH-value of the mixture being maintained at 4 to 5 by the simultaneous addition of 2 N sodium hydroxide solution. Stirring is continued until the dyestuff is completely formed, then further 2 N sodium hydroxide solution is added until a pH-value of 9 is reached and the resulting dyestuff suspension is stirred for 15 minutes at 40° to 45°. Then said suspension is filtered, the filtrate is washed with diluted sodium chloride solution and dried. The obtained dyestuff of the above formula is a brown powder which dissolves in hot water with a pure red color and yields brilliant red dyeings of excellent levelness and light fastness on wool, silk and synthetic polyamide fibers. With this dyestuff also on basic modified polypropylene fibers valuable red dyeings are obtained. It completely reserves cellulose fibers and unmodified polyolefin fibers.

If in the above Example, instead of 20 ml of aqueous 5 M sodium nitrite solution a corresponding amount of 5 M potassium nitrite solution, instead of the above-mentioned sodium hydroxide solutions corresponding potassium hydroxide solutions, and instead of diluted sodium chloride solution diluted potassium chloride solution are employed, then the potassium salt of the dyestuff of the Formula given above is obtained.

The dyestuff of the above-mentioned Formula can also be prepared as follows:

26.8 g of 1-aminobenzene-2-sulphonic acid-N-methyl-N-cyclohexylamide are dissolved in 200 ml of 80% acetic acid while heating, and the resultant solution is admixed with 30 ml of 10 N hydrochloric acid and cooled to 0°. To this mixture a solution of 6.9 g of sodium nitrite in a small amount of water is added at 0° to 10°, and the mixture is stirred until completion of the diazotisation. Then excess nitrous acid is decomposed by the addition of sulphamic acid. To the thus obtained solution of the diazonium salt are then added 25 g of 2-amino-8-hydroxynaphthalene-6-sulphonic acid as well as 40 g of crystalline sodium acetate, and the reaction mixture is stirred for 3 hours at 0° to 10°, heated slowly to 50°, stirred for another 2 hours at 50° to 55° and finally cooled to room temperature. The dyestuff of the Formula given above crystallizes out. Precipitation of the dyestuff is completed by the addition of diluted sodium chloride solution, the dyestuff is filtered, washed with diluted sodium chloride solution and dried.

If in Example 1 instead of 26.8 g of 1-aminobenzene-2-sulphonic acid-N-methyl-N-cyclohexylamide equivalent amounts of the diazo components given in the following Table and the same amount of 2-amino-8-hydroxynaphthalene-6-sulphonic acid are used, the procedure being otherwise as indicated above, dyestuffs having similarly good properties are obtained; the shades of said dyestuffs on synthetic polyamide fibers are given in the last column of said Table.

TABLE

| Ex. No. | diazo component | coupling component | shade on synthetic polyamide fibers |
|---|---|---|---|
| 2 | 1-amino-4-methylbenzene-2-sulphonic acid-N—methyl-N—cyclohexylamide | 2-amino-8-hydroxy-naphthalene-6-sulphonic acid | red |
| 3 | 1-amino-5-methylbenzene-2-sulphonic acid-N—methyl-N—cyclohexylamide | 2-amino-8-hydroxy-naphthalene-6-sulphonic acid | red |
| 4 | 1-amino-6-methylbenzene-2-sulphonic acid-N—methyl-N—cyclohexylamide | 2-amino-8-hydroxy-naphthalene-6-sulphonic acid | red |

EXAMPLE 5

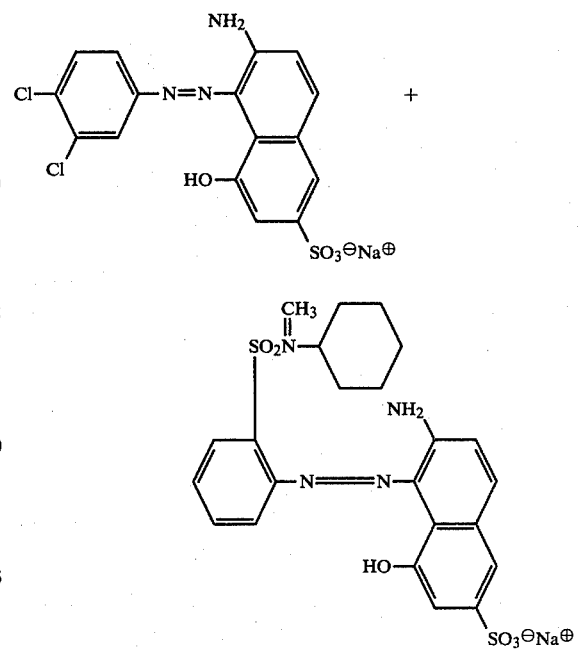

8.1 g of 1-amino-3,4-dichlorobenzene and 13.4 g of 1-aminobenzene-2-sulphonic acid-N-methyl-N-cyclohexylamide are dissolved in 200 ml of glacial acetic acid, the obtained solution is admixed with 30 ml of 10 N hydrochloric acid and cooled to 0°. Then 20 ml of 5 M sodium nitrite solution are added dropwise at 0° to 10°, stirring is continued for one hour and excess nitrous acid is decomposed by the addition of sulphamic acid. The diazonium salt solution thus formed is added dropwise, at 10° to 20°, to a solution of 25 g of 2-amino-8-hydroxynaphthalene-6-sulphonic acid in 200 ml of water and 12 ml of 10 N sodium hydroxide solution. By the simultaneous dropwise addition of additional sodium hydroxide solution the pH-value of the mixture is maintained at 4.0 to 4.5. Thereafter, stirring is continued until completion of the coupling, and precipitation of the dyestuff is completed by the addition of sodium chloride, followed by filtration. The filtrate is then slurried in 200 ml of 5% sodium chloride solution, sodium hydroxide solution is added dropwise to the obtained suspension until said suspension has a pH-value of 8, and then the suspension is stirred for one hour and filtered. The filter cake obtained is washed with dilute sodium chloride solution and dried. A mixture of dyestuffs of the above formulae is obtained. This dyestuff mixture dyes textile material made from wool, silk and/or synthetic polyamide from an acid bath in even red shades having very good fastness to light.

If, as starting material, 4.05 g and 12.15 g, respectively, of 1-amino-3,4-dichlorobenzene and 20.1 g and 6.7 g, respectively, of 1-aminobenzene-2-sulphonic acid-N-methyl-N-cyclohexylamide are used, the procedure being otherwise as described above, valuable red dyestuff mixtures having good fastness to light are also obtained.

EXAMPLE 6

100 g of tricot made from textured Polyamide 6.6 fibre material are introduced into a 40° warm solution of 1.5 g of the dyestuff prepared according to Example 1, 1 g of the di-sodium salt of dodecyldiphenyl-ether-disulphonic acid and 3 ml of 40% acetic acid in 5000 ml of water. While continuously stirring the dye liquor, the bath is slowly heated to boiling and dyeing is performed during 1 hour at boiling temperature. Then the dyed goods are thoroughly rinsed with cold water and dried. A brilliant red dyeing of excellent levelness, good fastness to wet processing and very good fastness to light is obtained.

The wet-fastness properties of the dyeing can be improved by the following after-treatment:

The exhausted dyebath is cooled to 80° and a dilute solution containing 3–6 g of the disodium salt of the reaction product of naphthalene sulfonic acid, dihydroxydiphenylsulfone and formaldehyde is added. The fiber material is treated for 15 minutes at 80°, then thoroughly rinsed with cold water and dried.

EXAMPLE 7

100 g of well wetted wool flannel are introduced at 50° into a dye bath which, in 5000 ml of water contains 2 g of the dyestuff prepared according to Example 1 and 3 ml of 85% formic acid, the temperature of the bath is raised to boiling temperature within 30 minutes and dyeing is continued for 45 minutes at boiling temperature. A pure red dyeing on wool is obtained with complete exhaustion of the bath, said dyeing being distinguished by excellent levelness, good fastnesses to wet processing and excellent light fastness.

EXAMPLE 8

1.5 g of the dyestuff prepared according to Example 1 are dissolved in 100 ml of water of 80°, 0.2 g of nonylphenol polyglycol ether as well as 5 g of a dye carrier mixture, consisting of the sodium salt of sulphated laurylalcohol diglycol ether, coconut oil fatty acid-N,N-bis-(β-hydroxyethyl)amide and isopropanol in a weight ratio of 9:9:2, are added to the solution, the dye liquor is diluted with cold water up to 1000 ml and the pH-value thereof is adjusted to about 5 by the addition of acetic acid.

A tufted carpet, the backing of which consists of jute or polypropylene fibers and the pile material of which consists of Polyamide 6 or Polyamide 6.6 fibers, is impregnated with the above-described dye liquor at room temperature and squeezed out to a liquor take-up of 300%, calculated on the dry weight of the carpet. The carpet is then steamed in a carpet steaming apparatus with saturated steam for 15 minutes at a temperature of 98° to 100°. Finally, the dyed carpet is rinsed with cold water and dried.

A red tufted carpet dyed evenly and well throughout, of very good fastness to light, is obtained.

What we claim is:

1. A process for the dyeing or printing of an organic fiber material selected from the group consisting of a basic modified polyolefin fiber material, polyurethane fiber material and natural or synthetic polyamide fiber material which comprises employing a monoazo dyestuff of the formula:

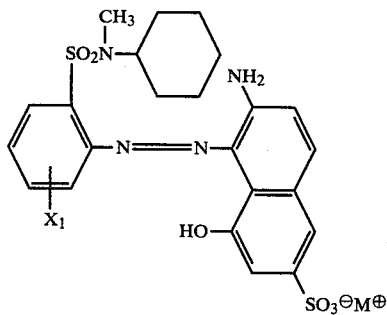

wherein $X_1$ represents hydrogen or the methyl group, and
$M^\oplus$ represents a colorless cation.

2. The process as defined in claim 1, wherein the fiber material is a natural or synthetic polyamide.

* * * * *

UNITED STATES PATENT AND TRADEMARK OFFICE
CERTIFICATE OF CORRECTION

PATENT NO. : 4,378,970
DATED : April 5, 1983
INVENTOR(S) : PAUL LIENHARD and FABIO BEFFA It is certified that error appears in the above—identified patent and that said Letters Patent is hereby corrected as shown below:

Column 4, line 3, change the second occurrence of "acid" to -- acid --;

Column 4, line 4, change "acid" to -- acid --;

Column 6, lines 15 to 28, rewrite the second formula of Example 5 as follows:

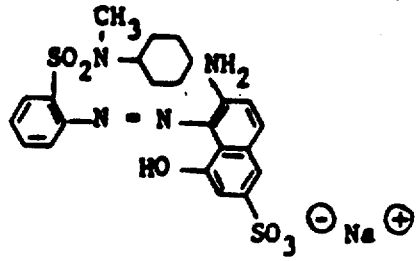

Signed and Sealed this

Twenty-fourth Day of January 1984

[SEAL]

Attest:

GERALD J. MOSSINGHOFF

Attesting Officer      Commissioner of Patents and Trademarks